(12) United States Patent
Christensen et al.

(10) Patent No.: US 8,694,908 B2
(45) Date of Patent: *Apr. 8, 2014

(54) COLOR AND SYMBOL CODED VISUAL CUES FOR RELATING SCREEN ITEMS TO EACH OTHER

(75) Inventors: Catherine Christensen, San Jose, CA (US); Ricardo L Gonzalez, San Jose, CA (US); David B Hamilton, San Jose, CA (US); Daina P Wickham, San Jose, CA (US); Robert E Medl, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/528,933

(22) Filed: Jun. 21, 2012
(Under 37 CFR 1.47)

(65) Prior Publication Data
US 2012/0262480 A1    Oct. 18, 2012

Related U.S. Application Data

(63) Continuation of application No. 11/931,814, filed on Oct. 31, 2007, now Pat. No. 8,219,924, which is a continuation of application No. 09/387,796, filed on Sep. 1, 1999, now Pat. No. 7,434,172, which is a continuation-in-part of application No. 08/954,852, filed on Oct. 21, 1997, now Pat. No. 6,184,881.

(51) Int. Cl.
*G06F 3/048* (2013.01)
*G06F 3/00* (2006.01)

(52) U.S. Cl.
USPC ........... 715/772; 715/775; 715/781; 715/810; 715/837

(58) Field of Classification Search
USPC .......... 715/772, 775, 781, 810, 835, 837, 849
See application file for complete search history.

(56) References Cited

U.S. PATENT DOCUMENTS

| | | | |
|---|---|---|---|
| 5,050,105 | A | 9/1991 | Peters |
| 5,202,726 | A | 4/1993 | McCulley et al. |
| 5,226,117 | A | 7/1993 | Miklos |
| 5,261,044 | A | 11/1993 | Dev et al. |
| 5,506,952 | A | 4/1996 | Choy et al. |
| 5,515,488 | A | 5/1996 | Hoppe et al. |
| 5,524,195 | A * | 6/1996 | Clanton et al. ............. 725/61 |
| 5,566,291 | A | 10/1996 | Boulton et al. |
| 5,596,700 | A | 1/1997 | Darnell et al. |
| 5,644,334 | A | 7/1997 | Jones et al. |
| 5,651,107 | A | 7/1997 | Frank et al. |

(Continued)

OTHER PUBLICATIONS

Rondall et al., Special Edition Using Microsoft FrontPage, Que Publishing, 1996, p. 12, 22, 23 & 33-43.

*Primary Examiner* — Nicholas Augustine
(74) *Attorney, Agent, or Firm* — IP Authority, LLC; Ramraj Soundararajan

(57) ABSTRACT

Described is a system and method for visually delineating a relationship between diverse, but related graphical objects in a graphical user interface. An icon that has specified color scheme is associated with the diverse, but related graphical objects. When one of the related graphical objects is displayed, the icon is displayed within the displayed graphical object. The persistence of the icon with the specified color scheme in the displayed graphical objects allows them to be recognized as related.

4 Claims, 5 Drawing Sheets

(56) References Cited

U.S. PATENT DOCUMENTS

| | | | |
|---|---|---|---|
| 5,737,553 A | 4/1998 | Bartok | |
| 5,740,440 A * | 4/1998 | West | 717/125 |
| 5,751,287 A | 5/1998 | Hahn et al. | |
| 5,751,965 A | 5/1998 | Mayo et al. | |
| 5,758,122 A * | 5/1998 | Corda et al. | 717/125 |
| 5,764,989 A | 6/1998 | Gustafsson et al. | |
| 5,765,176 A | 6/1998 | Bloomberg | |
| 5,767,855 A | 6/1998 | Bardon et al. | |
| 5,794,178 A * | 8/1998 | Caid et al. | 704/9 |
| 5,808,611 A | 9/1998 | Johnson et al. | |
| 5,825,357 A | 10/1998 | Malamud et al. | |
| 5,831,617 A | 11/1998 | Bhukhanwala | |
| 5,833,537 A | 11/1998 | Barrie | |
| 5,877,766 A * | 3/1999 | Bates et al. | 715/854 |
| 5,905,493 A | 5/1999 | Belzer et al. | |
| 5,924,101 A | 7/1999 | Bach et al. | |
| 5,933,142 A | 8/1999 | LaStrange et al. | |
| 5,933,143 A * | 8/1999 | Kobayashi | 715/805 |
| 5,990,886 A * | 11/1999 | Serdy et al. | 715/752 |
| 5,995,106 A * | 11/1999 | Naughton et al. | 715/854 |
| 6,020,888 A | 2/2000 | Ho | |
| 6,061,060 A * | 5/2000 | Berry et al. | 715/781 |
| 6,091,417 A | 7/2000 | Lefkowitz | |
| 6,108,004 A * | 8/2000 | Medl | 715/804 |
| 6,112,015 A * | 8/2000 | Planas et al. | 709/223 |
| 6,184,881 B1 | 2/2001 | Medl | |
| 6,225,997 B1 | 5/2001 | Mitsuoka et al. | |
| 6,289,222 B1 | 9/2001 | Cue et al. | |
| 6,297,824 B1 | 10/2001 | Hearst et al. | |
| 6,340,977 B1 | 1/2002 | Lui et al. | |
| 6,456,296 B1 * | 9/2002 | Cataudella et al. | 345/619 |
| 6,462,760 B1 | 10/2002 | Cox, Jr. et al. | |
| 6,594,696 B1 | 7/2003 | Walker et al. | |
| 6,636,248 B1 | 10/2003 | Christensen et al. | |
| 6,828,993 B1 | 12/2004 | Hendricks et al. | |
| 6,917,437 B1 | 7/2005 | Myers et al. | |
| 6,920,608 B1 | 7/2005 | Davis | |
| 7,073,121 B2 | 7/2006 | Brown et al. | |
| 2002/0032696 A1 | 3/2002 | Takiguchi et al. | |
| 2002/0118220 A1 | 8/2002 | Lui et al. | |
| 2003/0141987 A1 | 7/2003 | Hayes | |

* cited by examiner

COLOR AND SYMBOL CODED VISUAL CUES FOR RELATING SCREEN ITEMS TO EACH OTHER

RELATED APPLICATIONS

This application is a Continuation of U.S. application Ser. No. 11/931,814, filed Oct. 31, 2007, which is a Continuation of U.S. application Ser. No. 09/387,796, filed Sep. 1, 1999, now U.S. Pat. No. 7,434,172; which is a Continuation-In-Part of U.S. application Ser. No. 08/954,852, filed Oct. 21, 1997, now U.S. Pat. No. 6,184,881.

BACKGROUND OF THE INVENTION

1. Field of Invention

The present invention relates generally to the field of graphical user interfaces. More specifically, the present invention relates to using persistent visual cues to the user throughout related graphical user interfaces.

2. Discussion of Prior Art

The prior art is replete with examples of using icons in various schemes to present visual information related to a particular object. Many applications contain visual indicators that relate icons for existing objects of a particular type to an icon for creating new objects of that type. One known method is to superimpose the image of a star on the upper left-hand corner of an "existing" icon. For example, the icon for a document in Lotus WordPro® 96 is a blank page with the upper right-hand corner turned down, while the icon for a new document is the same but with a star in the upper left-hand corner. This metaphor is not carried any further than this, however; specifically, it is not carried into related graphical user interfaces or user assistance programs, e.g. wizards. What the prior art has failed to teach is a method of using persistent objects and color throughout interfaces belonging to a single family or related family.

Modern object-oriented graphical user interfaces display a large number of objects, toolbars, properties sheets, and wizards. Often times users have trouble determining what buttons will do before they use them. Interfaces do not provide consistent and redundant visual cues (i.e., graphics/spatial and color/hue) that allow users the ability to relate objects on their desktops to the controls and displays that affect them.

The present invention makes it easier to relate an object represented on the user interface with its associated controls and displays based on basic human pattern matching abilities. The Windows®95 Explorer toolbar has an icon for the "map network drive" function. However, the tool bar icon fails to share the color or the graphic of the object that will show up on your desktop after you map a network drive. Additionally, the windows that are displayed to gather user input for setting the parameters for mapping a drive do not have a matching graphic or color cues. Matching the color and graphic would help users: 1) find the toolbar button to start the interaction, 2) track the interaction during the sequence of windows that gather the parameters, and 3) recognize the resulting mapped drive when it appeared on their desktop at the completion of the interaction.

The patent to Hoppe et al. (U.S. Pat. No. 5,515,488), assigned to Xerox Corporation, provides for a Method and Apparatus for Concurrent Graphical Visualization of a Database Search and its Search History. A graphical representation of a query to a database enables creation and traversal of the search history. Relationships between objects are noted graphically. The reference, however, appears to be focused on nesting techniques.

The patent to West (U.S. Pat. No. 5,740,440), assigned to Objective Software Technology, provides for a Dynamic Object Visualization and Browsing System. An animated graphical display reflects the status of selected objects and their interrelationships.

The patent to Hahn et al. (U.S. Pat. No. 5,751,287), assigned to Documagix, Inc., provides for a System for Organizing Document Icons with Suggestions, Folders, Drawers, and Cabinets. Each drawer can be marked with a graphic icon for easier visual identification. The drawer and associated text can also be colored. Folders can similarly be named, described and keyed with a color.

The patent to Corda et al. (U.S. Pat. No. 5,758,122), assigned to The United State of America, provides for an Immersive Visual Programming System. During execution of a compiler, the flow of data objects and the interaction among the data objects is visually displayed to the user. Objects may retain some color aspects.

The patent to Bloomberg (U.S. Pat. No. 5,765,176), assigned to Xerox Corporation, provides for Performing Document Image Management Tasks Using an Iconic Image having Embedded Encoded Information. Iconic versions of pages or sections of text are used to organize, in reduced size, a plurality of embedded text objects. Bloomberg further describe general methods of using color. Bloomberg, however, discusses watermarking as a way to ensure data integrity, not to provide visual cues as to related family or interface objects.

The patent to Caid et al. (U.S. Pat. No. 5,794,178), assigned to HNC Software, Inc., provides for a Visualization of Information Using Graphical Representations of Context Vector Based Relationships and Attributes. Caid discloses visualization of textual information by translating context vectors into visual and graphical representations. General teachings are provided to 3D icons with a specific shape, size, color, texture and movement.

Whatever the precise merits, features ad advantages of the above cited references, none of them achieves or fulfills the purposes of the present invention as described in the detailed description that follows.

SUMMARY OF THE INVENTION

The present invention provides an initial icon and color scheme to represent a particular application. As a user traverses related objects belonging to the same family, the initial icon and color scheme is persistent throughout each of the related objects.

The present invention provides an article of manufacture comprising computer usable medium having computer readable program code embodied therein implementing a method of delineating a relationship between related graphical objects, said computer readable program code executable in a computer, wherein the medium comprises computer readable program code: associating a first icon with a first graphical object, the icon having a first color scheme; displaying the first icon with the first specified color scheme within the first graphical object; progressively displaying a series of graphical objects diverse from, but related to the first graphical object, the one or more related graphical objects reflecting an evolution of progression of development of the first graphical object, and wherein the first icon with the specified color scheme is displayed within each of the related graphical objects, and the first icon associated with an evolution of progression of development of the first graphical object being distinguishable from a second icon associated with an evolution of progression of development of a second graphical object.

The present invention provides an article of manufacture comprising computer usable medium having computer readable program code embodied therein implementing a method of delineating a relationship between related graphical objects, said computer readable program code executable in a computer, wherein the medium comprises computer readable program code: associating a first icon with a first set of diverse, but, related graphical objects, the first icon having an first color scheme, and associating a second icon with a second set of at least two diverse, but related graphical objects, the second icon having a second color scheme, wherein the first and second icons are distinguishable from each other. When a graphical object in the first set is displayed, the medium further comprises computer readable program code displaying the first icon within the displayed graphical object in the first set, and when a graphical object in the second set is displayed, the medium further comprises computer readable program code displaying the second icon within the displayed graphical object in the second set; and wherein the displayed graphical objects in the first and second sets are recognizable as related by the persistence of the first and second icons, respectively.

DESCRIPTION OF THE PREFERRED EMBODIMENTS

Figure 1:
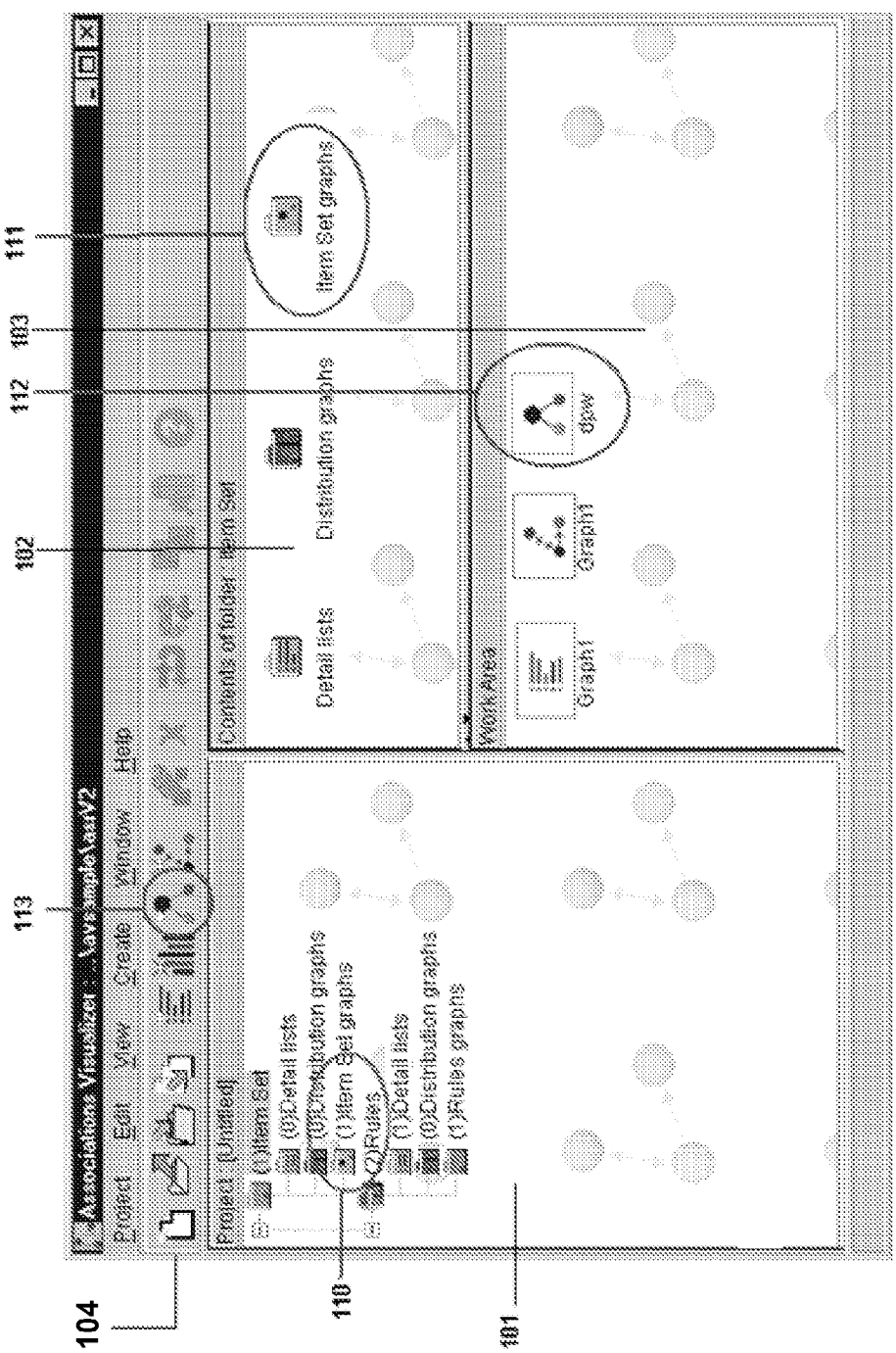
FIG. 1 illustrates a display screen capture illustrating multiple placement of designated icon with persistent color scheme.

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

Object-oriented graphical user interfaces (GUIs) represent objects in the interface that are of interest to users. Users complete various tasks on these objects such as creating new objects, organizing objects, and editing existing objects. This invention uses a specific color and graphical symbol scheme to tie together the interface controls and displays (windows, dialogs, buttons) that allow the user to control, organize, create, and display these objects.

In various applications, it may be necessary to develop many instances of an object. For example, in the visualization of data mining results, the objects represent types of displays (e.g., a Item Set graph, a Rules graph, a Distribution graph, etc.), and each instance represents a different version of that display depending on parameters set by the user.

FIGS. 1-5 collectively illustrate, in the preferred embodiment of a graphical user interface, the persistence of a designated graphical symbol and associated color scheme is used in the representation of the family of displays and controls for an Item Set graph on the desktop, its containers, properties notebooks, wizards, and the application tool bar. The use of persistent symbols and colors schemes enables the user to quickly determine the particular family or families of graphical user interfaces being used at any one moment.

FIG. 1 illustrates a GUI 100 including: Toolbar 104, Projects container 101, Contents of folder container 102, and Work Area container 103.

In the present invention, a static icon and color scheme is generated by a visual designer for each graph type. The icons and color schemes are placed on the objects and their folders to assist the user in making a visual relationship with the particular family. One instantiation of one of those types, a Item Set graph 112 named "dpw", is displayed in the Workarea container 103. This instantiation has a specific icon and color scheme. The icon and color scheme are displayed on its large folder icon 111 in the Contents of Folder container 102 and on its small folder icon 110 displayed in the Projects container 101. It is this retention of persistent icon characteristics and coloring scheme that provides a user immediate recognition of related files of similar type. The color tracking function enables low level following of related objects without an understanding of the exact underlying connections and hierarchy. The toolbar 104 contains a button that also retains a facsimile of the icon and color scheme 113 that the user can use to create a new instance of an item set graph.

Figure 2:
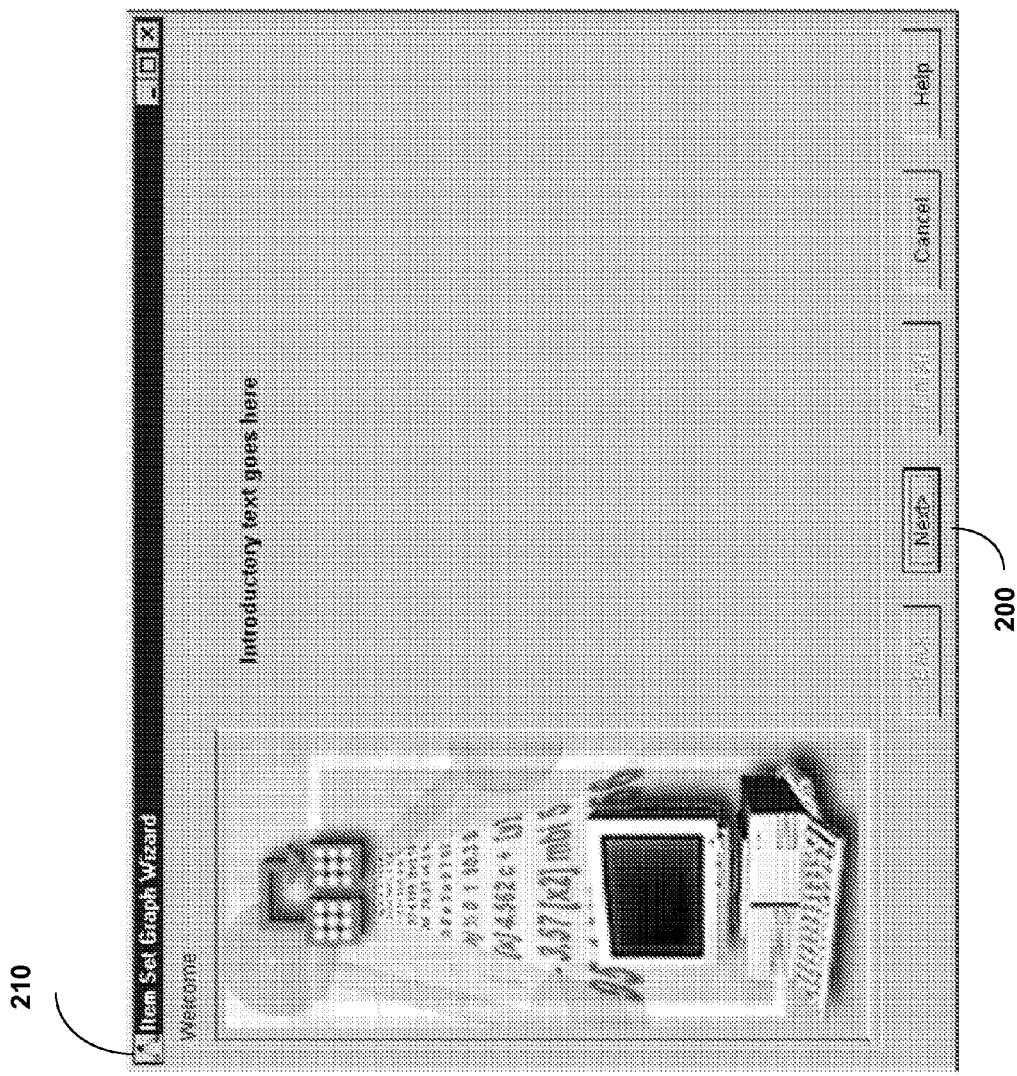
FIG. 2 illustrates an item set graph wizard with the designated icon with persistent color scheme of FIG. 1.

FIG. 2 illustrates a GUI screen capture 200 of an item set wizard used to create an item set graph 112 which is placed within the item set parent folder 110/111. As with each object/sub-object created within this family, the titlebar includes the preselected icon and color scheme 210 as a visual aid to the user for an immediate recognition of the family presently being used.

Figure 3:
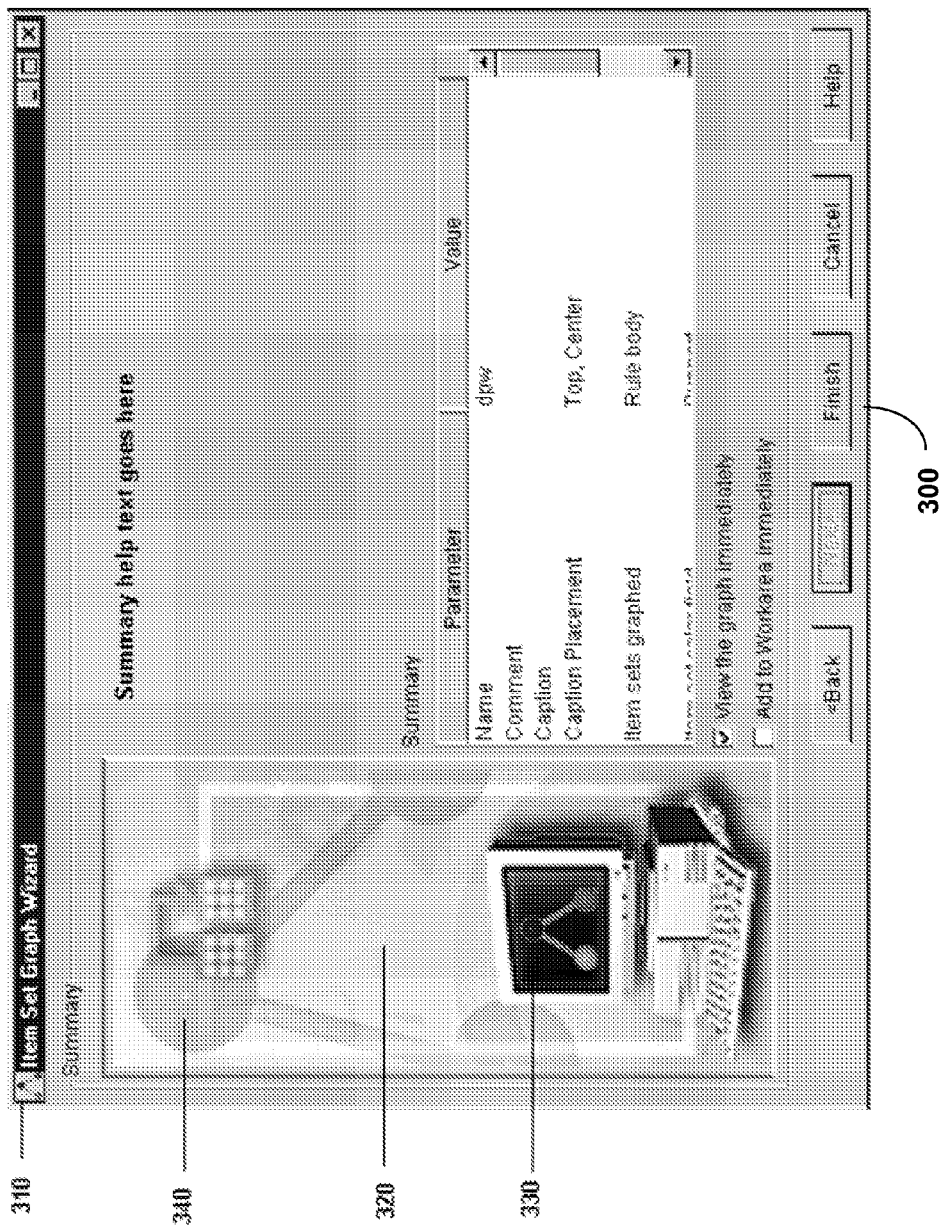
FIG. 3 illustrates a wizard summary page with graphics incorporating the designated icon and persistent color scheme of FIG. 1.

FIG. 3 illustrates a GUI screen capture 300 of an item set graph wizard summary page which displays the parameters chosen during the implementation of the wizard and to be ultimately used to display data within the item set graph 112. As with each object/sub-objects created within this family, the title bar includes the preselected icon and color scheme 310 as a visual aid to the user for an immediate recognition of the family presently being used. In addition, the preselected icon and color scheme 320 is shown to be incorporated with a graphics section 330 of the screen capture.

Figure 4:
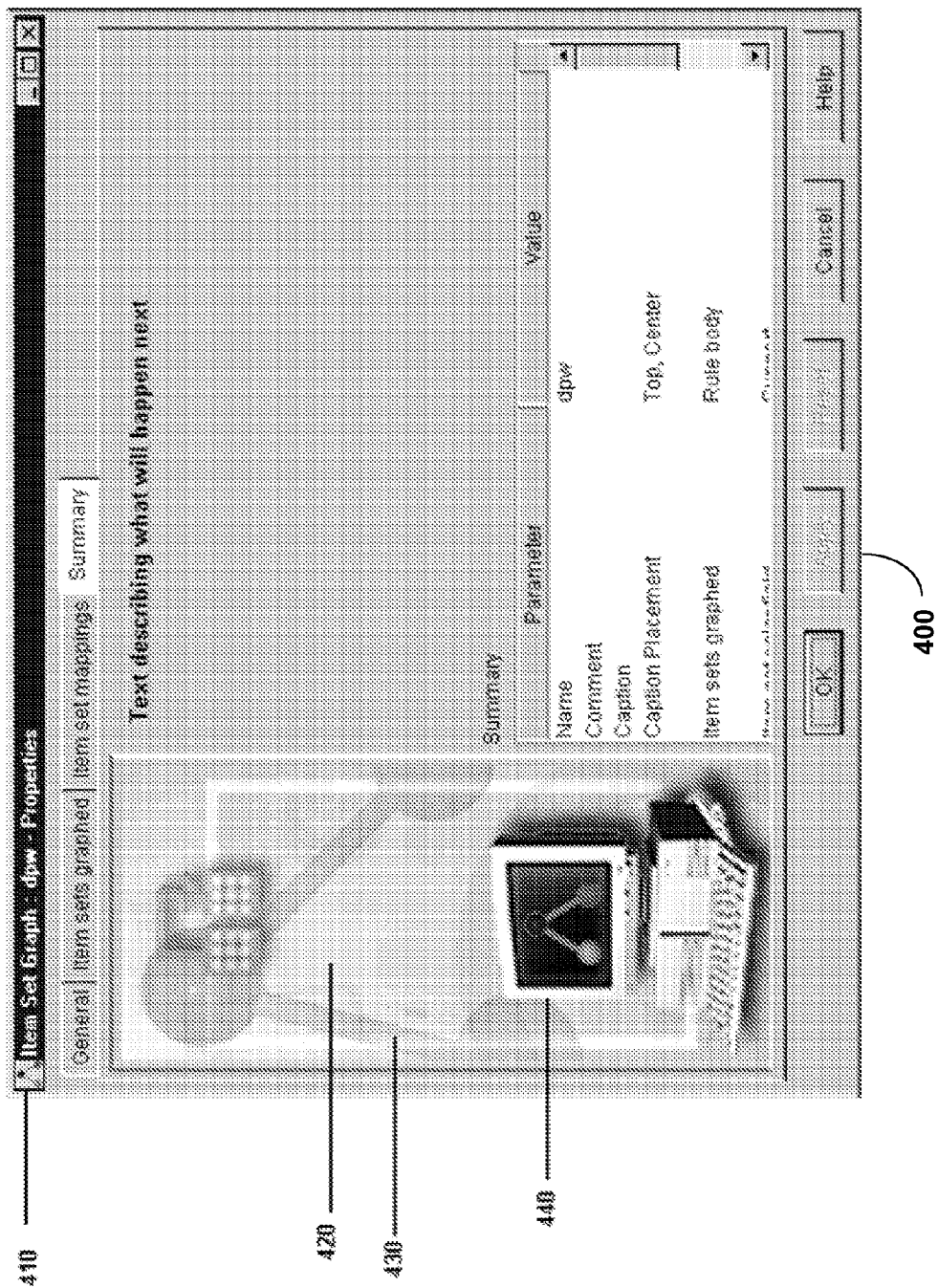
FIG. 4 illustrates a notebook graphical user interface with the designated icon with persistent color scheme of FIG. 1.

FIG. 4 illustrates a GUI screen capture 400 of a properties notebook for the item set graph wizard shown in FIG. 2. As with each object/sub-objects created within this family, the title bar includes the preselected icon and color scheme 510 as a visual aid to the user for an immediate recognition of the family presently being used.

Figure 5:
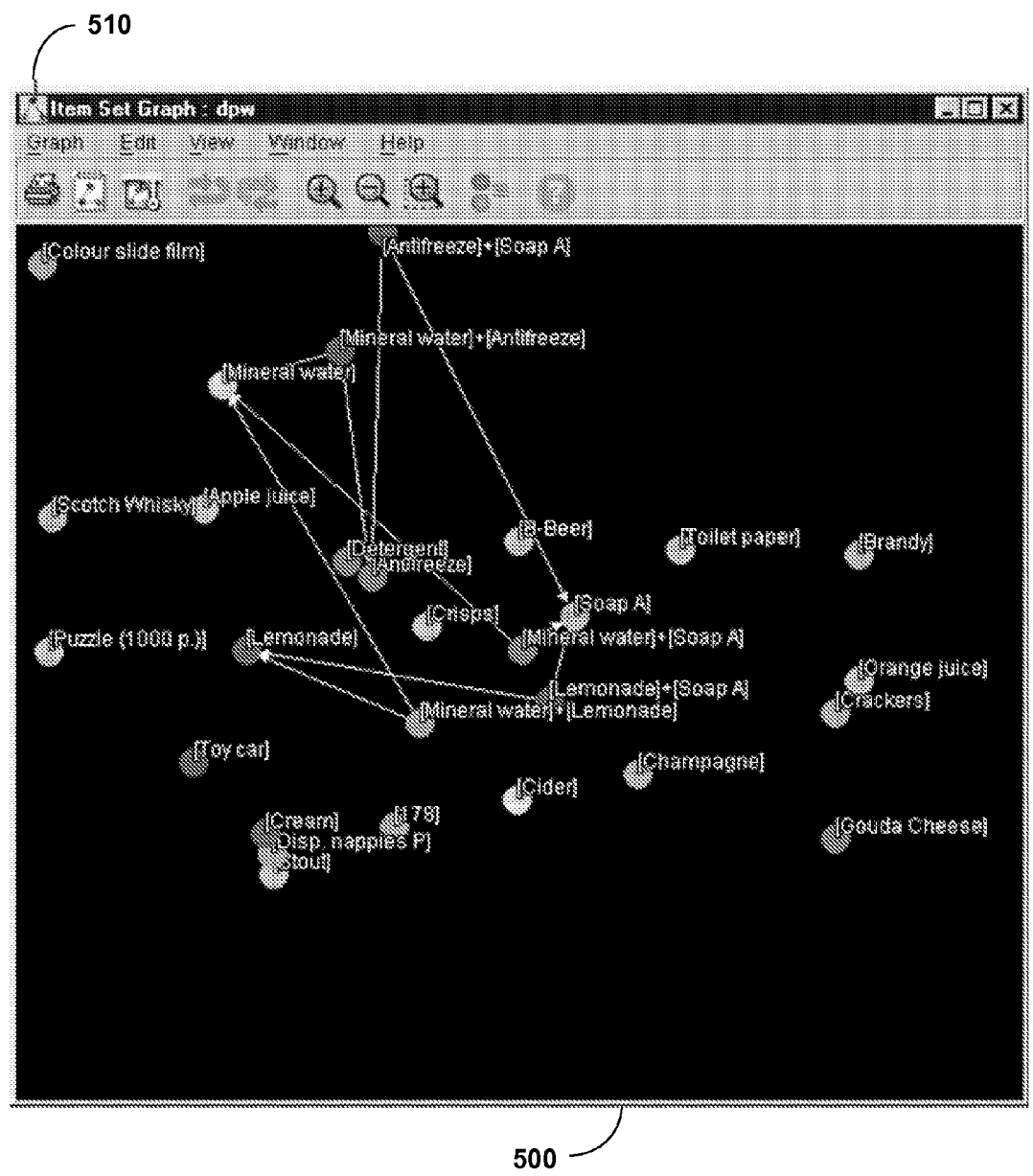
FIG. 5 illustrates an item set graph with the designated icon with persistent color scheme of FIG. 1.

FIG. 5 illustrates a GUI screen capture 500 of an item set graph used to display data within the item set graph 112 created using the item set graph wizard shown in FIG. 2. As with each object/sub-objects created within this family, the title bar includes the preselected icon and color scheme 510 as a visual aid to the user for an immediate recognition of the family presently being used.

The above icons and color schemes and the described functional elements are implemented in various computing environments. For example, the present invention may be implemented on a conventional IBM PC or equivalent, multinodal system (e.g. LAN) or networking system (e.g. Internet, WWW). All programming, mining algorithms, GUIs, display panels and dialog box templates, metadata and data related thereto are stored in computer memory, static or dynamic, and may be retrieved by the user of the Intelligent Mining system in any of: conventional computer storage, display (i.e. CRT) and/or hardcopy (i.e. printed) formats. The programming of the present invention may be implemented by one of skill in the art of object-oriented programming.

CONCLUSION

A system and method has been shown in the above embodiments for the effective implementation of a persistent iconic and color scheme visual cue for relating various objects within the same application. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, specific computing hardware and specific iconic color or symbol schemes. In addition, the specific chosen icons are representative of the preferred embodiment and should not limit the scope of the invention. Various icons and color schemes can be selected to be persistent throughout any related GUIs.

We claim:

1. An article of manufacture comprising computer usable medium having computer readable program code embodied therein implementing a method of delineating a relationship between related graphical objects, said computer readable program code executable in a computer and said medium comprising:

computer readable program code associating a first icon with a first set of diverse, but, related graphical objects, said first icon having a first color scheme, and computer readable program code associating a second icon with a second set of at least two diverse, but related graphical objects, said second icon having a second color scheme, said first and second icons being distinguishable from each other;

when a graphical object in said first set is displayed, computer readable program code displaying said first icon within said displayed graphical object in said first set, and when a graphical object in said second set is displayed, displaying said second icon within said displayed graphical object in said second set; and wherein said displayed graphical objects in said first and second sets are recognizable as related by the persistence of said first and second icons, respectively, and wherein said persistence of said first icon with said first color scheme provides user assistance when traversing a series of graphical templates, and wherein said persistence of said second icon with said second color scheme provides user assistance when traversing a different series of graphical templates.

2. The article of manufacture of claim 1, wherein said first icon is displayed within a visible portion of said displayed graphical object in said first set and said second icon is displayed within a visible portion of said displayed graphical object in said second set.

3. An article of manufacture comprising computer usable medium having computer readable program code embodied therein implementing a method of delineating a relationship between related graphical objects, said computer readable program code executable in a computer and said medium comprising:

computer readable program code associating a first icon with a first graphical object, said first icon having a first color scheme;

computer readable program code displaying said first icon with said first specified color scheme within said first graphical object;

computer readable program code progressively displaying a first series of graphical objects diverse from, but related to said first graphical object, said first series of graphical objects reflecting an evolution of progression of development of said first graphical object;

computer readable program code associating a second icon with a second graphical object, said second icon having a second color scheme;

computer readable program code displaying said second icon with said second specified color scheme within said second graphical object;

computer readable program code progressively displaying a second series of graphical objects diverse from, but related to said second graphical object, said second series of graphical objects reflecting another evolution of progression of development of said second graphical object, and wherein said first icon with said first color scheme is displayed within each graphical object in said first series of graphical objects and said second icon with said second color scheme is displayed within each graphical object in said second series of graphical objects, and said first icon associated with the evolution of progression of development of said first graphical object being distinguishable from said second icon associated with said another evolution of progression of development of said second graphical object.

4. The article of manufacture of claim 3, wherein said related graphical objects reflecting said evolution of progression of development of said first graphical object collectively comprise a user assistance wizard.

* * * * *